USO05558299A

United States Patent [19]

Veile

[11] Patent Number: 5,558,299
[45] Date of Patent: Sep. 24, 1996

[54] WING FOLD PUSH-PIN LOCKING ASSEMBLY

[75] Inventor: Joseph R. Veile, St. Louis, Mo.

[73] Assignee: McDonnell Douglas Corporation, St. Louis, Mo.

[21] Appl. No.: 229,637

[22] Filed: Apr. 19, 1994

[51] Int. Cl.⁶ ............................. F16H 59/00; G05G 5/00
[52] U.S. Cl. ................. 244/49; 244/3.27; 244/3.28; 244/131; 74/477; 74/483 R
[58] Field of Search .................. 244/3.27, 3.28, 244/3.29, 49, 75 R, 90 R, 131; 74/477, 483 R, 483 K, 485

[56] References Cited

U.S. PATENT DOCUMENTS

| 2,584,038 | 1/1952 | Morrison | 244/83 |
|---|---|---|---|
| 2,637,221 | 5/1953 | Backus et al. | 74/745 |
| 2,847,871 | 8/1958 | Schick | 74/477 |
| 3,081,053 | 3/1963 | Jarrell | 244/49 |
| 3,780,602 | 12/1973 | Thornley | 74/850 |
| 4,550,628 | 11/1985 | Yarnell | 74/477 |
| 4,633,730 | 1/1987 | Scalisi et al. | 74/477 |
| 4,688,744 | 8/1987 | Aldrich | 244/75 R |
| 4,695,014 | 9/1987 | Mourani | 244/75 R |
| 4,856,362 | 8/1989 | Jester | 74/477 |
| 4,932,929 | 1/1990 | Capewell | 244/75 R |
| 4,979,700 | 12/1990 | Tiedeman et al. | 244/75 R |
| 5,042,749 | 8/1991 | Jacques et al. | 244/75 R |
| 5,310,138 | 5/1994 | Fitzgibbon | 244/49 |

*Primary Examiner*—Andres Kashnikow
*Assistant Examiner*—Virna L. Mojica
*Attorney, Agent, or Firm*—Howell & Haerkamp, L.C.

[57] ABSTRACT

An improved wing fold assembly for use in aircraft which provides relative rotational movement of a first wing tip about a second fixed wing including a plurality of wing tip flanges, and a plurality of fixed wing flanges wherein all of said flanges are rotatably mounted to a central shaft and wherein the improvement comprises means for selectively interlocking said wing tip flanges in relation to said fixed wing flanges to thereby lock said wing tip in position relative said fixed wing in either of a folded or faired position.

22 Claims, 4 Drawing Sheets

WING FOLD PUSH-PIN LOCKING ASSEMBLY

BACKGROUND OF THE INVENTION

This invention relates generally to a rotatable locking device and, more particularly, to an assembly for use with aircraft wings which allows one section of a wing to fold by way of a hinge and to securely lock so as to prevent movement at established points within the angle of rotation.

Hinged wing fold assemblies are used, for example, with respect to military aircraft in order that multiple aircraft may be compactly stowed together. Due to the obvious space constraints aboard aircraft carriers and like vessels, foldable aircraft wing assemblies find particular utility in applications of this sort. With the advantage of gained space, however, arises a number of critical considerations pertaining to the flight readiness character and in-flight safety and navigability of aircraft having folding wings.

There exists a known prior art wing fold assembly which involves an elaborate gear train system consisting of planetary and ring gears and having integral lugs for attachment of the gear train to both the inner fixed wing component and the outer folding wing component of an aircraft having a wing fold assembly. Due to the great number of gearings in the series-arranged train assembly, the system is made entirely of steel. Driving the system requires a geared transmission also constructed of steel as well as a motor sufficiently powerful to render the system operable. While systems of this type have proven the viability of foldable wing assemblies in aircraft and, more particularly, high-performance military aircraft, these systems are afflicted with a host of significant disadvantages and shortcomings. In particular, the all-steel construction of the system presents a number of inherent problems. Steel is heavy, expensive and prone to corrosion. Moreover, the individual steel gearing components are expensive and time-consuming to produce as well as vulnerable to physical wear. Further, the geared configuration of the system fails to provide an adequate "locking" means particularly when the outer wing component is in its faired or fully extended position. While the actuated gear drive holds the foldable wing section in its extended position during flight, extreme gravitational and torsional forces are imposed upon this hinged joint by certain high-performance military aircraft often creating undesirable movement at the joint. Movement such as this is typically referred to as "back lash." An enhanced degree of stiffness or reduced back lash at the fold joint is thereby necessitated. Accordingly, the performance characteristics of various aircraft are adversely affected or limited by the known device.

Thus, the art has lacked a wing fold assembly that is comparatively light, simple in design, resistant to corrosion and reliable in service that can provide much improved joint stiffness without gears. The invention disclosed and claimed herein achieves these advantages in a manner not revealed by the prior art.

SUMMARY OF THE INVENTION

The wing fold locking assembly of the present invention provides a substantially gearless and hinged series-configured mechanism which combines smooth and efficient partial rotability or foldability of one wing section about another with a positive stop and locking function. The assembly is simple in both its features and operation and, when compared to the prior art, represents considerable savings in both time of manufacture and maintenance, and production cost. The locking assembly of the present invention truly represents a significant advance over the known art in that, in addition to the advantages already cited, it provides a heretofore unknown positive locking function which secures the foldable wing section relative the fixed wing section when the foldable section is both folded and faired. By contrast, the known assembly fails to provide any type of positive locking mechanism and, rather, relies only upon the discrete operation of the gearing assembly in order to fix the foldable wing section in both its faired and folded positions.

Generally, the assembly comprises a system of adjacent, rotatable drums and plates arranged in series and held in snug relation by a transverse and partially threaded fixed shaft which extends through a central bore within the assembly from one end to the other. The assembly further comprises an alternating ball bearing and pin interlock arrangement transversely disposed through and between alignable pin bores within each of the series-arranged drums and plates. A single functional unit of the hinge assembly comprises an alternating arrangement of drums and plates. The outermost edges of the drums and the plates, which project outwardly and away from the center of the assembly, define flanges having bores which allow for the attachment of the drums to the fixed wing section and the plates to the foldable wing section of an aircraft having a wing fold assembly. A single conventional pinion gear is disposed at one end of the assembly for engagement with gear teeth disposed upon the arcuate periphery of a plate, the gear teeth of the plate substantially subtending a ninety degree angle. The pinion gear is actuated by a conventional motor sufficiently powerful only to raise and lower the foldable wing into its folded and faired positions. Once the foldable wing is so positioned a conventional linear actuator such as a solenoid, a hydraulic piston/cylinder assembly or another known rotary to linear actuator, which is operatively connected to the pins, slidably inserts the pins through the alignable bores and selectively reciprocates the pins into and out of the alignable bores between first and second positions of the pins relative to the plates. The first position of the pins, relative to the plates, is effected when the pins are inserted through the alignable bores in the drums and the plates locking the plates and thereby the outer foldable wing component attached thereto, in relative folded and faired positions. The second position of the pins, relative to the plates, exists when the pins are withdrawn from the alignable bores freeing the plates and thereby the outer foldable wing component attached thereto, for relative movement about the fixed wing.

In the preferred embodiment, a single functional unit of the assembly comprises an alternating and adjacent arrangement of three drums and two plates which define a total of two flanges for attachment to the foldable wing section and four flanges for attachment to the fixed wing section. The drums and plates are preferably made of titanium—a material known for its combination of light weight and exceptional strength. While titanium is not an inexpensive material, particularly when compared outright to steel, the relative cost of manufacture in the present invention compares very favorably with the high cost of precision machining that is required in making the geared steel assembly constituting the prior art. In addition, and of equal importance, considerable and desirable weight savings and corrosion resistance are achieved when titanium is used. Other suitable drum and plate materials include nickel-steel alloy compositions together with a variety of known air-craft aluminum alloy compositions. The preferred pin and ball material is stainless steel due to its corrosion resistance, relative weight and shear strength. Further, while ball bearings having a diameter that corresponds with the width of each plate are preferred, shorter pin segments which also correspond in length to the width of each plate may also readily be employed.

While the principal advantages and features of the present invention have been described above, a more complete and thorough understanding of the invention may be attained by referring to the drawings and more detailed description of the preferred embodiment which follow.

DETAILED DESCRIPTION OF THE PREFERRED EMBODIMENT

Figure 1:
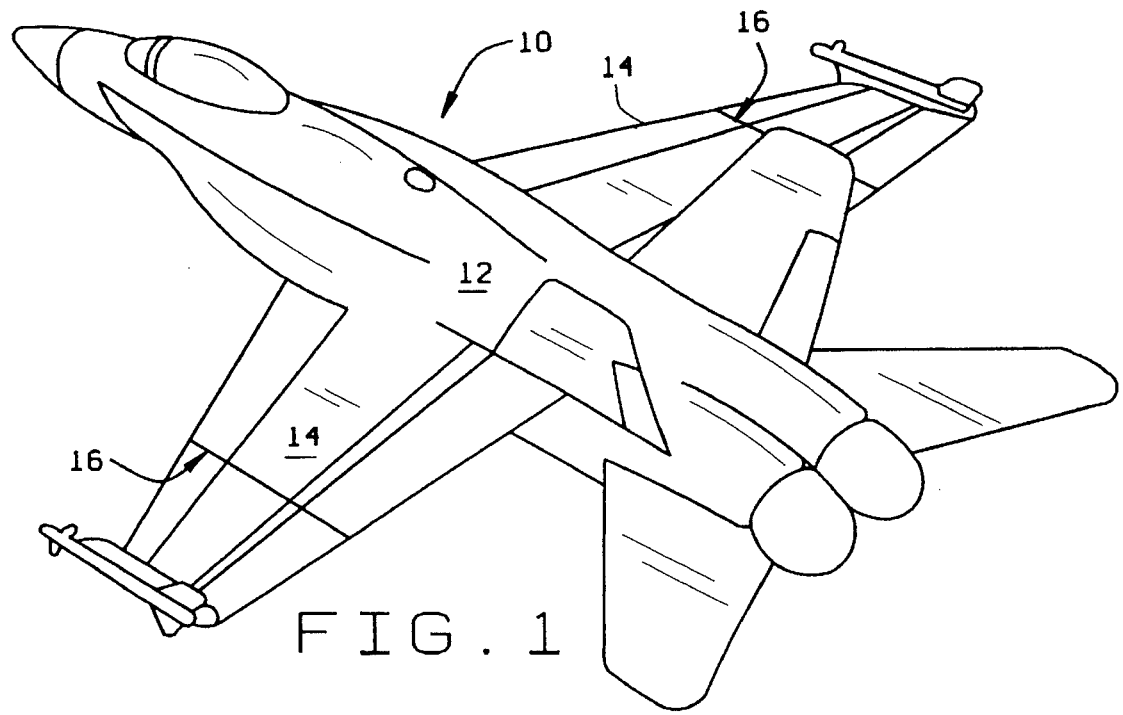
FIG. 1 is a diagrammatic perspective view of an aircraft showing a wing fold joint concealing a wing fold assembly.
Figure 4:
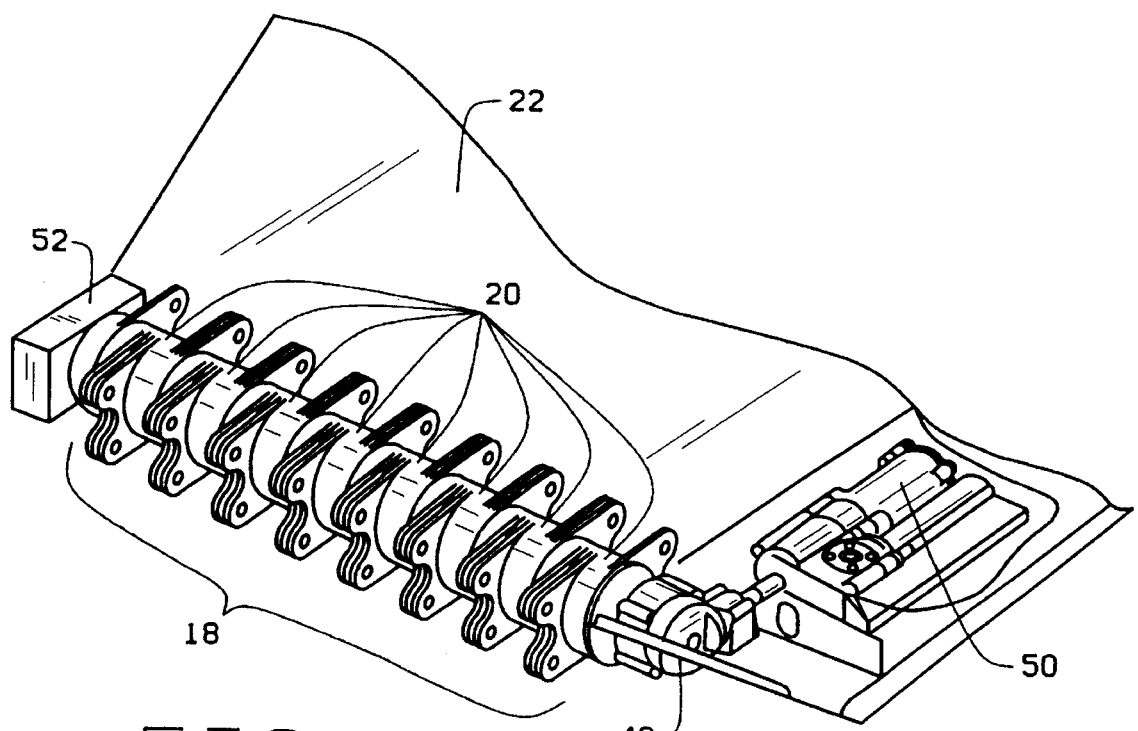
FIG. 4 is a cut-away plan view showing the relative placement of the series-arranged assemblies of both the prior art and the present invention as well as the operative environment of both.

Referring now by reference numerals to the drawings, and first to FIGS. 1 and 4, it will be understood that there is shown an aircraft 10 having a fuselage portion 12 and laterally extending wings 14. Upon the latter, there exist wing fold joints 16 which broadly define the operative environment of a hinged wing fold assembly 18 such as representatively shown in FIG. 4.

Figure 2:
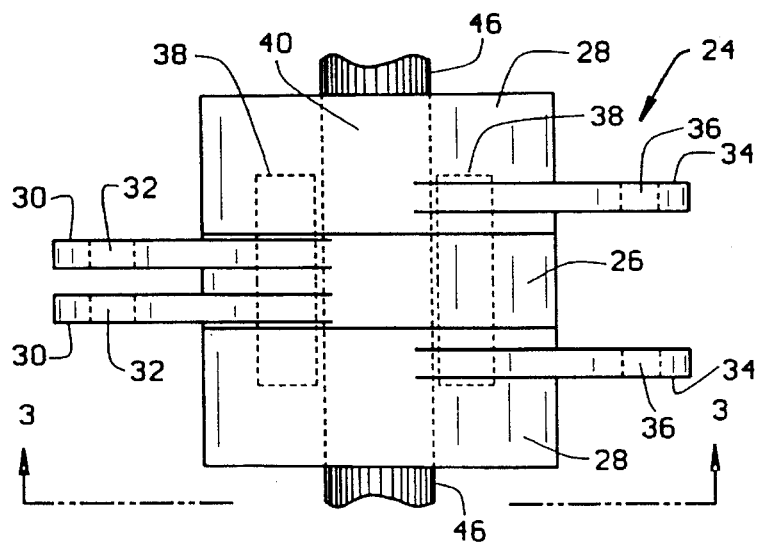
FIG. 2 is a top, plan view of one functional unit from the geared prior art wing fold assembly.
Figure 3:
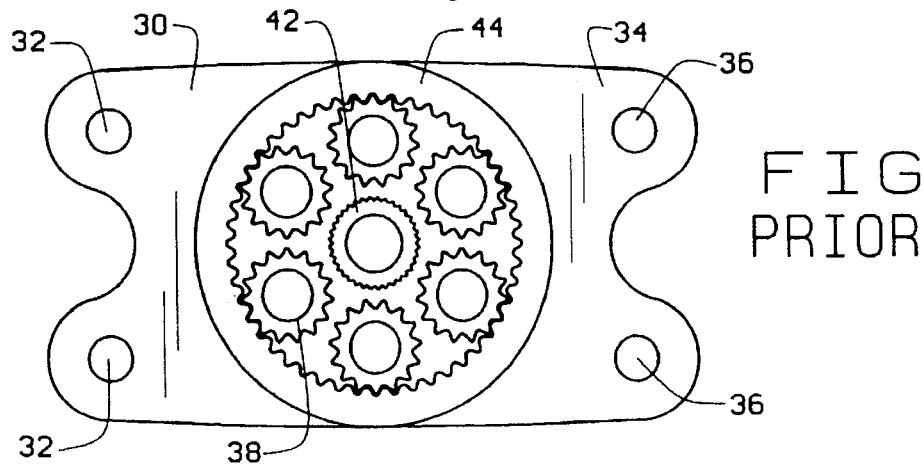
FIG. 3 is a side elevational view of the geared prior art wing fold assembly taken along the plane of line 3—3 in FIG. 2 and showing the relative arrangement of the ring, planetary and sun gearing.

As shown in FIGS. 2 and 3, and as representatively shown in FIG. 4, a gear-actuated wing fold assembly 18 constituting the prior art is known. The prior art assembly comprises a plurality of series-arranged, hinged functional units 20 representatively shown in FIG. 4 attached on one side to an inner fixed wing aspect 22 of an aircraft. A single prior art functional unit 24, as shown in FIG. 2, comprises an inner casing 26 and two outer casings 28. Integrally adapted to the inner casing 26 are a pair of lugs 30 having bores 32 for attachment of lugs 30 to an outer folding wing component of an air-craft having a wing fold assembly. Similarly, outer casings 28 each have an integrally adapted lug 34 having bores 36 which provide for attachment of the outer casing 28 to an inner fixed wing component of an aircraft. Shown in phantom in FIG. 2 are planetary gears 38 and a central transverse gear housing 40 as disposed within the inner 26 and outer 28 casings of the functional unit 24. The inner 26 and outer 28 casings are able to rotate in relation to one and other by virtue of the mechanical interaction of the planetary gears 38 and the central transverse gear housing 40. The precise operative relationship between these elements can be readily appreciated by those skilled in the art by referring, more particularly, to FIG. 3 which is a side elevational view of the prior art functional unit 24 taken along line 3—3. It is important to note that, while FIG. 3 shows only one side of functional unit 24, the other side would be a virtually identical mirror image. In FIG. 3, the complex arrangement of the planetary arrangement is shown to include a central sun gear 42 surrounded by planetary gears 38 which engage the teeth and mesh with a ring gear 44. When arranged in series, a plurality of functional units identical to that shown as 24 in FIG. 2 are connected on either side through the central transverse gear housing 40 by a plurality of geared splines 46 as best shown in FIG. 2. The representative wing fold assembly 18 in FIG. 4 clearly illustrates the series arrangement of the prior art assembly and shows further the driving mechanism of the assembly which includes a geared steel transmission 48 operatively connected to a motor 50 sufficiently powerful to both actuate the complex geared assembly and rotate the foldable wing component which attaches thereto. FIG. 4 also shows the conventional means by which the assembly is supported by a carriage 52 at the end of the assembly opposite the transmission 48 and motor 50. It will be readily understood by those skilled in the art, in view of the foregoing description and references to the cited drawings, that when energy is supplied to the motor 50 and conveyed to the assembly 18 by the transmission 48 the central sun 42, planetary 38 and ring 44 gearing will cooperate to rotatably move inner casing 26 in relation to outer casings 28.

Figure 5:
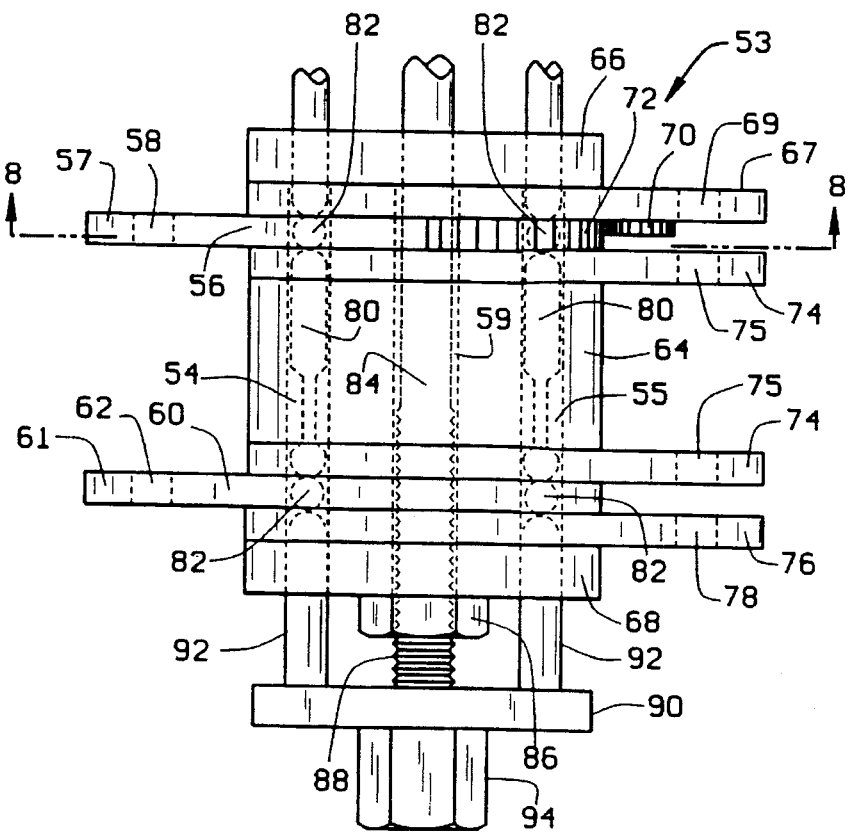
FIG. 5 is a top plan view of one functional unit of the present invention.

Referring now to FIGS. 5–9, a wing fold assembly 18, as representatively shown in FIG. 4, is constructed in accordance with the present invention. As with the prior art assembly discussed above, the present invention comprises a plurality of series-arranged, hinged functional units 20 representatively shown in FIG. 4 attached on one side to an inner fixed wing aspect 22 of an air-craft. A single functional unit of the present invention 53, as best shown in FIG. 5, comprises an alternating arrangement of plates and drums having first 54 and second 55 alignable bores and a third central bore 59 disposed transversely therethrough. The arrangement is more particularly characterized by a first plate 56 having a flange 57 and vertically spaced bores 58, a second plate 60 having a flange 61 and vertically spaced bores 62, a central drum 64 disposed between the first 56 and second 60 plates, and first and second outer drums 66 and 68 respectively disposed adjacent the first 56 and second 60 plates on the sides correspondingly opposite the sides of each of these plates adjacent central drum 64. FIG. 5 also shows that first outer drum 66 includes a flange 67 and vertically spaced bores 69 as well as a pinion gear 70 that meshes with the gear teeth on the arcuate periphery 72 of first plate 56. Still further, central drum 64 is shown to include flanges 74 and corresponding vertically spaced bores 75 and second drum 68 is seen to include flanges 76 and vertically spaced bores 78. Also depicted, partially in phantom, in FIG. 5 is the important ball bearing and pin interlock aspect of the present invention. This arrangement includes the alternating pins 80 and ball bearings 82 resident within the first 54 and second 55 alignable bores and further comprises the partially threaded central shaft 84 resident within transverse central bore 59. Also comprising part of this arrangement are the fixed internally threaded female receiver 86 through which the threaded aspect 88 of the partially threaded shaft 84 passes and a butt plate 90 into which terminal pin portions 92 are fixedly attached and through which the threaded aspect 88 of the partially threaded shaft 84 further passes through and into a movable female receiver 94 when the arrangement is actuated by a conventional linear actuator (not detailed). A terminal butt plate 52 or other conventional part which fixedly receives correspondingly opposite portions of pins 92 and the non-threaded terminal aspect of the shaft 84 completes the pin and ball bearing interlock arrangement and is generally and representatively shown in FIG. 4.

Figure 6:
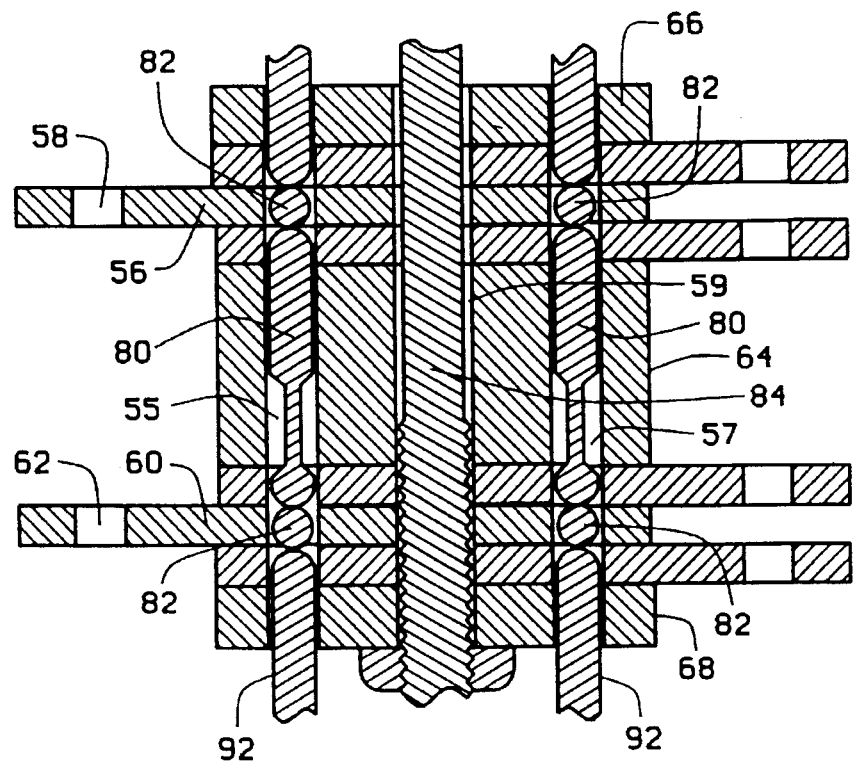
FIG. 6 is a top plan view of one functional unit of the present invention in section showing the assembly in an unlocked rotatable position.
Figure 7:
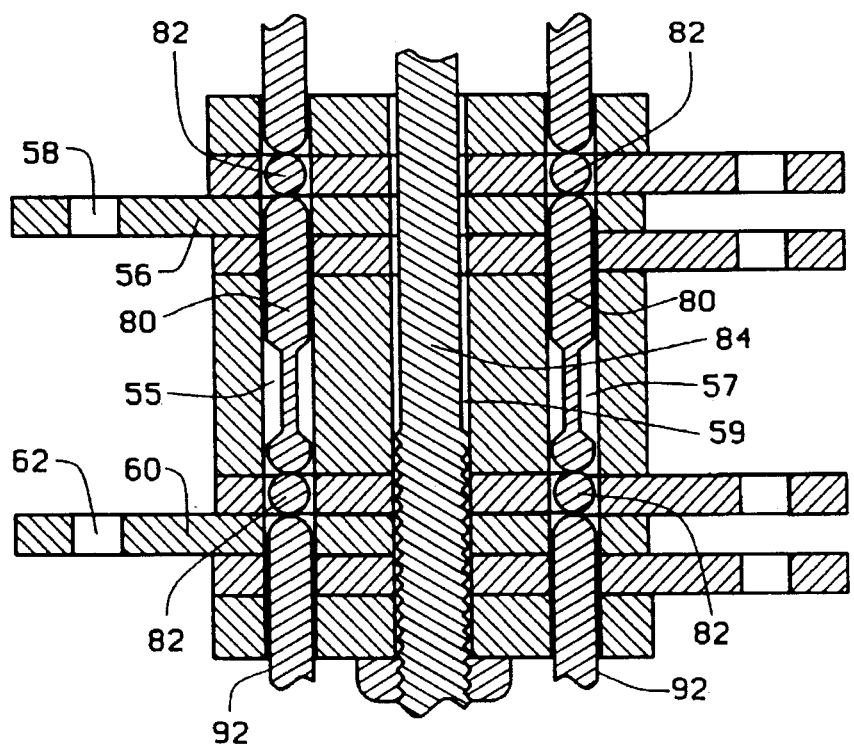
FIG. 7 is a similar top plan view of one functional unit of the present invention in section showing the assembly in a locked, faired position.

The relative positions of the pins 80, 92 and ball bearings 82 when the wing fold assembly is in an unlocked and locked position, respectively, are very plainly shown in FIGS. 6 and 7. The principal components of the interlock arrangement can readily be seen in FIGS. 6 and 7. When considered in conjunction with FIG. 5, these figures provide effective insight into the operation of the interlock. The principal components of the interlock arrangement generally comprise alternating pins 80, 92 and ball bearings 82 disposed within the transverse alignable bores 54, 55 within the plates 56, 60 and drums 64, 66 and 68. FIG. 6 shows the wing fold assembly in an open or unlocked position and, as such, ball bearings 82 are aligned with plates 56 and 60 while disposed within those portions of alignable bores 55 and 57 disposed therein. Similarly, while the assembly is in an open or unlocked position, the pin 80 components of the assembly are resident within those portions of alignable bores 55, 57 disposed within the drums 64, 66 and 68. Terminal pin portions 92 are excepted from this rule as some portion of these parts is not fully resident within the bore of a drum when the assembly is in its unlocked position (See FIG. 5). When it is desired to positively lock the assembly, as depicted in FIG. 7, a conventional linear actuator which operatively connects to the terminal pin portions 92 cooperates conventionally with the partially threaded central shaft 84 disposed within the central bore 59 to displace within the central bore 59 the ball bearings 82 from their position of alignment within the plates 56, 60. With the operation of the linear actuator, as described, a continuous line of coaction will be achieved between all of the plate 56, 60 and drum 64, 66, 68 interlocks arranged in series and comprising the assembly 18 as representatively shown in FIG. 4. A simple reverse function is performed in order to realign the ball bearings 82 within the plates 56, 60 and thereby unlock the assembly in preparation for moving the foldable wing section. FIGS. 5, 6, and 7 also very clearly show the relative dimensions of the pins 80, 92, ball bearings 82 and shaft 84 to their corresponding bores 54, 55 and 59.

Figure 8:
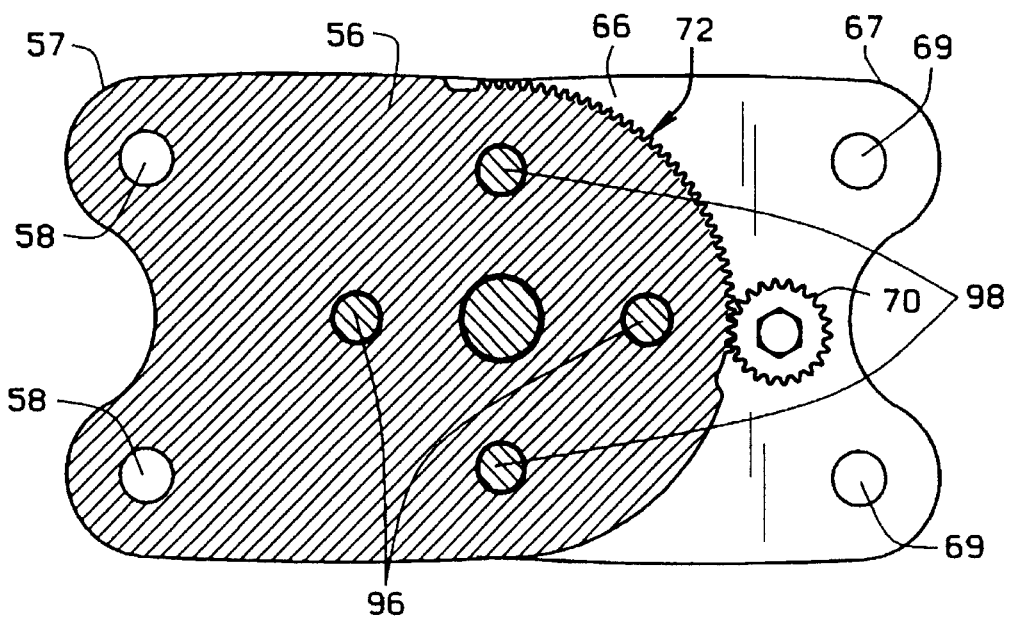
FIG. 8 is a side elevational view of the present invention taken along the plane of line 8—8 in FIG. 5 and showing the assembly in its locked, faired position.
Figure 9:
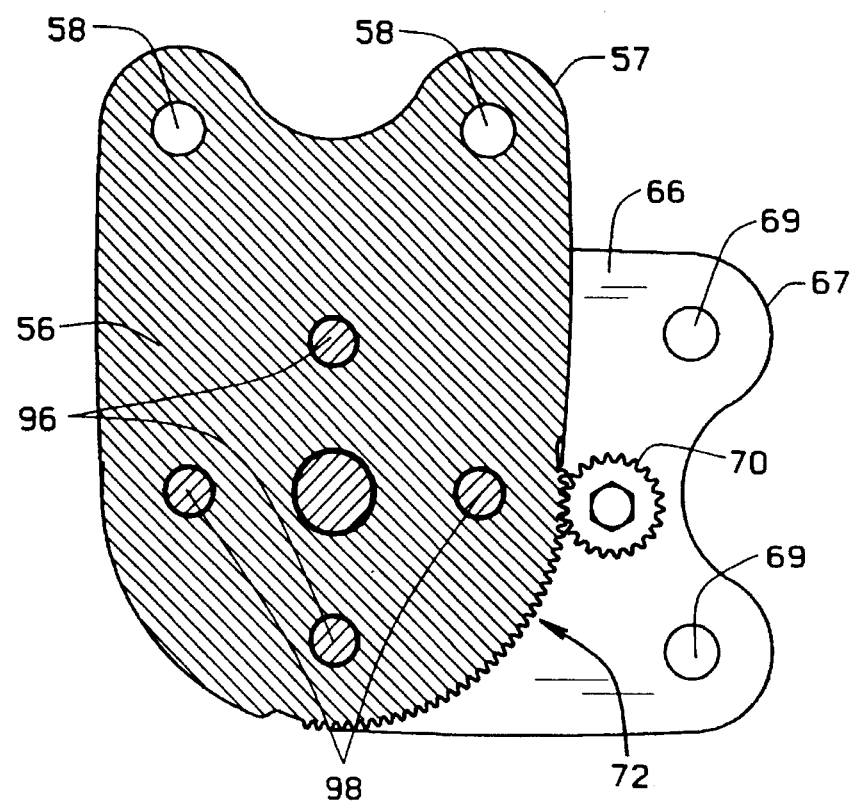
FIG. 9 is also a side elevational view of the present invention showing the assembly in its locked, folded position.

Finally, the manner in which the wing fold assembly of the present invention is rotated by virtue of the pinion gear 70 is particularly well depicted in FIG. 8 which is a cross-sectional view taken along line 8—8 of FIG. 5 and in FIG. 9. FIGS. 8 and 9 show clearly that when the wing fold assembly of the present invention is in its faired and folded positions the respective arrangements of plate 56 to flange 66 are linear and substantially horizontal. In addition, the configuration and relative positions of the alignable bores 54, 55, 59 as disposed within plate 56 together with the gear-toothed arcuate periphery 72 of plate 56 are clearly shown. Further, it becomes plain that, while the drums 64, 66, 68 of each functional unit 53 must possess only a pair of alignable bores 54, 55 in order to accommodate the ball bearing 82 and pin 80, 92 arrangement, each plate 56 must possess a total of four bores comprising first 96 and second 98 aligned bore pairs. As further shown in FIGS. 8 and 9, the first 96 aligned bore pair corresponds with a horizontal relationship between plate 56 and drum 66 and are thereby operational when it is desired to lock the wing assembly in its faired position. Consequently, the second 98 aligned bore pair prove operational when it is intended that the wing assembly be in its folded position. It is important to note that the cross-hatching shown with respect to the second 98 aligned bore pair in FIG. 8 and with respect to the first 96 aligned bore pair in FIG. 9 represents ball bearings 82 as each plate 56 requires a total of four ball bearings to be disposed within the first 96 and second 98 alignable bore pairs disposed therein.

There are various changes and modifications which may be made to the invention as would be apparent to those skilled in the art. However, these changes or modification are included in the teaching of the disclosure, and it is intended that the invention be limited only by the scope of the claims appended hereto.

What is claimed is:

1. In a wing fold assembly for use in aircraft which provides relative rotational movement of a first wing tip about a second fixed wing and includes a plurality of wing tip flanges, a plurality of fixed wing flanges and all of said flanges being rotatably mounted to a central shaft, the improvement comprising:

means for selectively interlocking said wing tip flanges in relation to said fixed wing flanges to thereby lock said wing tip in position with respect to said fixed wing in either of a folded or faired position, said interlocking means including an alternating pin and ball bearing arrangement which slidably inserts into and out of alignable bores within respective body components integral with said flanges, said body components disposed to operatively receive said central shaft.

2. A wing fold assembly for use in an aircraft which provides relative rotational movement of a first wing tip about a second fixed wing by way of a plurality of wing tip flanges and a plurality of fixed wing flanges wherein:

each of said wing tip flanges and said fixed wing flanges are, respectively, fixedly attachable on a first side to said wing tip and said fixed wing and rotatably mounted on a second side to a central shaft by way of respective body components; and including a locking assembly for selectively interlocking said wing tip flanges in relation to said fixed wing flanges in either of a folded or faired position, said locking assembly including a pin for retractable extension through the respective body component of at least one of said flanges.

3. The wing fold assembly of claim 1, including a conventional linear actuator operatively connected to said alternating pin and ball bearing arrangement for slidably inserting said arrangement into and out of said alignable bores within said body components.

4. The wing fold assembly of claim 3, wherein said pin and ball bearing arrangement is made of stainless steel and said body components and said flanges are made of titanium.

5. A wing fold assembly for use in aircraft which provides relative rotational movement of a first wing section about a second wing section comprising:

a plurality of adjacently disposed drums and plates arranged in series and having alignable bores disposed transversely therethrough, said drums being connected to one of said first or second wing sections and said plates being connected to the other of said wing sections;

an alternating ball and pin arrangement transversely disposed through and between said alignable bores within said drums and plates;

means for selectively reciprocating said ball and pin arrangement into and out of said alignable bores; and means for rotating said first wing section with respect to said second wing section to move said first wing section between folded and faired positions.

6. The wing fold assembly of claim 5, wherein a single functional unit of said assembly comprises three drums and two plates alternately arranged.

7. The wing fold assembly of claim 5, wherein said drums and plates are made of titanium and said ball and pin arrangement is made of stainless steel.

8. The wing fold assembly of claim 5, wherein said means for selectively reciprocating said ball and pin arrangement comprises a linear actuator operatively connected to said ball and pin arrangement and to the terminal aspect of a partially threaded fixed shaft extending through and communicating with a central bore within said assembly from one end to the other.

9. The wing fold assembly of claim 5, wherein said means for rotating said first wing section comprises a pinion gear disposed at one end of said assembly that meshes with gear teeth disposed upon the arcuate periphery of one of said plates.

10. The wing fold assembly of claim 6, wherein said drums and plates are made of titanium and said ball and pin arrangement is made of stainless steel.

11. The wing fold assembly of claim 10, wherein said means for selectively reciprocating said ball and pin arrangement comprises a linear actuator operatively connected to said ball and pin arrangement and to the terminal aspect of a partially threaded fixed shaft extending through and communicating with a central bore within said assembly from one end to the other.

12. The wing fold assembly of claim 11, wherein said means for rotating said first wing section comprises a pinion gear disposed at one end of said assembly that meshes with gear teeth disposed upon the arcuate periphery of one of said plates.

13. In an aircraft wing of the type having a gear actuated foldable wing assembly arranged in series and providing relative rotational movement of a first wing section about a second wing section, the improvement comprising in combination with the assembly:

a substantially gearless, series-arranged assembly comprising:

a plurality of adjacently disposed drums and plates having alignable bores disposed transversely therethrough, said drums being connected to one of said first or second wing sections and said plates being connected to the other of said wing sections;

an alternating ball and pin arrangement transversely disposed through and between said alignable bores within said drums and plates;

means for selectively reciprocating said ball and pin arrangement into and out of said alignable bores; and means for rotating said first wing section with respect to said second wing section to move said first wing section between folded and faired positions.

14. The wing fold assembly of claim 13, wherein a single functional unit of said assembly comprises three drums and two plates alternately arranged.

15. The wing fold assembly of claim 13, wherein said drums and plates are made of titanium and said ball and pin arrangement is made of stainless steel.

16. The wing fold assembly of claim 13, wherein said means for selectively reciprocating said ball and pin arrangement comprises a linear actuator operatively connected to said ball and pin arrangement and to the terminal aspect of a partially threaded fixed shaft extending through and communicating with a central bore within said assembly from one end to the other.

17. The wing fold assembly of claim 13, wherein said means for rotating said first wing section comprises a pinion gear disposed at one end of said assembly that meshes with gear teeth disposed upon the arcuate periphery of one of said plates.

18. The wing fold assembly of claim 14, wherein said drums and plates are made of titanium and said ball and pin arrangement is made of stainless steel.

19. The wing fold assembly of claim 18, wherein said means for selectively reciprocating said ball and pin arrangement comprises a linear actuator operatively connected to said ball and pin arrangement and to the terminal aspect of a partially threaded fixed shaft extending through and communicating with a central bore within said assembly from one end to the other.

20. The wing fold assembly of claim 19, wherein said means for rotating said first wing section comprises a pinion gear disposed at one end of said assembly that meshes with gear teeth disposed upon the arcuate periphery of one of said plates.

21. The wing fold assembly of claim 2, wherein the respective body components are integral with said flanges and said locking assembly comprises an alternating pin and ball bearing arrangement which slidably inserts into and out of alignable bores within the respective body components integral with said flanges, said body components disposed to operatively receive said central shaft.

22. The wing fold assembly of claim 21, including a conventional linear actuator operatively connected to said alternating pin and ball bearing arrangement for slidably inserting said arrangement into and out of said alignable bores within said body components.

* * * * *